United States Patent
Zhang et al.

(10) Patent No.: US 11,619,931 B1
(45) Date of Patent: Apr. 4, 2023

(54) INTERFACE INTEGRATION METHOD OF AGV JOB AUTOMATIC SCHEDULING SYSTEM AND MES SYSTEM

(71) Applicant: Machinery Technology Development Co., Ltd, Beijing (CN)

(72) Inventors: Sheng Zhang, Beijing (CN); Bin Xu, Beijing (CN); Xiangzhen Kong, Beijing (CN); Jian Jiao, Beijing (CN)

(73) Assignee: MACHINERY TECHNOLOGY DEVELOPMENT CO., LTD, Beijing (CN)

( * ) Notice: Subject to any disclaimer, the term of this patent is extended or adjusted under 35 U.S.C. 154(b) by 0 days.

(21) Appl. No.: 17/837,068

(22) Filed: Jun. 10, 2022

(30) Foreign Application Priority Data

Jan. 5, 2022 (CN) .......................... 202210003790.3

(51) Int. Cl.
G05B 19/418 (2006.01)
(52) U.S. Cl.
CPC . G05B 19/41895 (2013.01); G05B 19/41865 (2013.01)
(58) Field of Classification Search
None
See application file for complete search history.

(56) References Cited

U.S. PATENT DOCUMENTS

2010/0082497 A1* 4/2010 Biesemann .......... G06Q 10/103
705/301

FOREIGN PATENT DOCUMENTS

| CN | 103824136 A | 5/2014 |
|---|---|---|
| CN | 107621825 A | 1/2018 |
| CN | 113703409 A | 11/2021 |
| CN | 113837532 A | 12/2021 |
| CN | 113885456 A | 1/2022 |

* cited by examiner

Primary Examiner — Carlos R Ortiz Rodriguez
(74) Attorney, Agent, or Firm — Bayramoglu Law Offices LLC (57) ABSTRACT

An interface integration method of AGV job automatic scheduling system and MES system includes an AGV job automatic scheduling system unit, an MES system unit and a data transmission and processing unit. The data transmission and processing unit performs interface integration through a data dictionary which includes multiple data sets. Based on the standardized data dictionary integration method, the relevant data in the manufacturing process in the factory are classified and stored in the above-mentioned multiple data sets, respectively, which can greatly reduce the non-standard customization characteristics of data that need to be mutually integrated when the interface of the MES system unit is integrated with the interface of the AGV job automatic scheduling system unit, thereby facilitating the seamless and standardized integration of the MES system and the AGV system in the manufacturing process in digital workshops or smart factories, and enabling interconnection and interoperability.

14 Claims, 4 Drawing Sheets

INTERFACE INTEGRATION METHOD OF AGV JOB AUTOMATIC SCHEDULING SYSTEM AND MES SYSTEM

CROSS-REFERENCE TO THE RELATED APPLICATION

This application is based upon and claims priority to Chinese Patent Application No. 202210003790.3, filed on Jan. 5, 2022, the entire contents of which are incorporated herein by reference.

TECHNICAL FIELD

The present application relates to an interface integration method of AGV job automatic scheduling system and MES system.

BACKGROUND

AGV (Automatic Guided Vehicle) is a type of vehicle capable of travelling along a prescribed guide path without a driver. Generally, the travel route and behavior of an AGV can be controlled by a computer. An AGV job automatic scheduling system is a system that can implement central supervision, control and scheduling for multiple AGVs simultaneously, being mainly employed in application scenarios involving a large number of AGVs and transportation routes, as well as frequent and complex transportation, thereby making a material transportation system more flexible, automated, and unmanned.

MES (Manufacturing Execution System) is a production information management system for the workshop execution layer of manufacturing enterprises, which can provide operators and managers with the execution and tracking of plans and obtain the current status of all resources. The MES can optimize and manage the entire production process from order placement to product manufacturing through information transfer, and when real-time events occur on site, the MES can not only respond to them and report them, but also perform guiding and processing with current accurate data. Such rapid response to status changes allows the MES to reduce the number of non-value-added activities and effectively guide the production operation process of a factory, so that the MES can not only enhance the factory's ability to deliver products in time and improve the flow performance of materials, but also increase the return on production.

During the entire manufacturing process in the factory, the AGV job automatic scheduling system can exchange data with the MES, for example, the MES queries job information currently being executed or queued to be executed in the AGV job automatic scheduling system, the MES issues the job information to the AGV job automatic scheduling system, and the AGV job automatic scheduling system returns the status of a job to the MES. However, in the related art, problems in interfacing the MES with the AGV job automatic scheduling system lie in that the interface between the MES and the AGV job automatic scheduling system is not uniform and non-standard, accompanied by inconsistent types of data sent and received, which significantly affects the interfacing efficiency and information transmission quality between the AGV job automatic scheduling system and the MES.

SUMMARY

An objective of the present application is to provide an interface integration method of AGV job automatic scheduling system and MES system, so as to enable a seamless connection between the MES system and the AGV job automatic scheduling system in the process of product manufacturing in the factory, as well as interconnection and interoperability.

In order to achieve the objective above, the interface integration method of AGV job automatic scheduling system and MES system adopts the following technical solutions:

an interface integration method of AGV job automatic scheduling system and MES system, involving an AGV job automatic scheduling system unit, an MES system unit and a data transmission and processing unit; the data transmission and processing unit includes a first interface configured to communicate with the MES system unit, and a second interface configured to communicate with the AGV job automatic scheduling system unit; the data transmission and processing unit performs interface integration through a data dictionary; the data dictionary includes a material information definition data set, a transportation job requirement data set, an external inventory information data set, an inventory information data set, a material status interaction data set and an AGV status data set;

the method comprises:

the MES system unit changing the transportation job requirement data set and the external inventory information data set in the data transmission and processing unit through the first interface, to allow the AGV job automatic scheduling system unit in combination with the material information definition data set to generate a transportation job requirement; the MES system unit changing the material status interaction data set through the first interface, to allow the AGV job automatic scheduling system unit in combination with the material information definition data set to control inventory material check and overdue material processing; the MES system unit obtaining the inventory information data set through the first interface, to guide on-site production equipment to schedule production in combination with the material information definition data set; and the MES system unit obtaining the AGV status data set through the first interface, to display running status of the AGV job automatic scheduling system;

the AGV job automatic scheduling system unit changing the transportation job requirement data set in the data transmission and processing unit through the second interface, to feed back job execution status to the MES system unit;

wherein the transportation job requirement generated by the AGV job automatic scheduling system unit includes a warehousing job, which comprises returning surplus materials from a loading station of the equipment, returning an empty pallet from the loading station, and warehousing a finished product from an unloading station; steps of performing the warehousing job comprise:

step 1, storing the material information definition data set, the material status interaction data set, the transportation job requirement data set, the external inventory information data set, the inventory information data set and the AGV status data set in the data transmission and processing unit;

step 2, the MES system unit distributing the job requirement by changing the transportation job requirement data set and the external inventory information data set;

step 3, the AGV job automatic scheduling system unit accepting the job by receiving the transportation job requirement data set and the external inventory information data set, and further generating the transportation job in combination with the inventory information data set, the external inventory information data set and the material information definition data set, and then feeding back the status of the received job by updating data items in the transportation job requirement data set;

step 4, the AGV job automatic scheduling system unit assigning a specific AGV to perform the transportation job and updating the transportation job requirement data set, and then feeding back a job progress in the transportation job requirement data set through an execution status of the AGV;

step 5, the AGV job automatic scheduling system unit deleting information about pallets carried by the AGV from the external inventory information data set when loading is completed, adding information about pallets carried by the AGV to the inventory information data set when unloading is completed, and updating the status of the data items in the transportation job requirement data set when the loading is completed or when the unloading is completed, so as to give feedback on the status of the job; and step 6, the MES system unit and the AGV job automatic scheduling system unit sending and receiving the transportation job requirement data set and the external inventory information data set regularly or in real time by means of timed polling in combination with data status triggering, the MES system unit regularly sending and then transmitting the material information definition data set to the AGV job automatic scheduling system unit through the data transmission and processing unit, and the AGV job automatic scheduling system unit sending, in real time, and then transmitting the inventory information data set to the MES system unit through the data transmission and processing unit.

In an embodiment, the transportation job requirement generated by the AGV job automatic scheduling system unit further includes an ex-warehousing job, and the ex-warehousing job comprises loading the loading stations of the equipment with a material and loading the unloading stations with the empty pallet; performing the ex-warehousing job also comprises 6 steps, viz., steps 1', 2', 3', 4', 5' and 6', wherein steps 1'-4' and step 6' are the same as steps 1-4 and step 6 for performing the warehousing job, and the step 5' is as follows: the AGV job automatic scheduling system unit deleting information about pallets carried by the AGV from the inventory information data set when loading is completed, adding the information about pallets carried by the AGV to the external inventory information data set when unloading is completed, and updating the status of the data items in the transportation job requirement data set when the loading is completed or when the unloading is completed, so as to give feedback on the status of the job.

In an embodiment, the data dictionary further includes a handling pallet exception data set for storing relevant data when the handling pallet is abnormal, and the step 4 is as follows:

firstly, the AGV job automatic scheduling system unit generating scheduling instructions through the transportation job requirement data set and an inventory location status in the inventory information data set in the data dictionary, and scheduling a specific AGV to execute job instructions;

secondly, the AGV job automatic scheduling system unit detecting whether an identity number of a pallet performing the job is consistent with an assigned logical identity number of the pallet during the loading; when consistent, the AGV job automatic scheduling system unit allowing the AGV to continue to execute the instructions and updating the transportation job requirement data set; and when inconsistent, the AGV job automatic scheduling system unit writing an exception notification including a wrong identity number of the pallet and corresponding material information, as well as a correct identity number of the pallet and corresponding material information into the handling pallet exception data set, and then transporting the pallet to an exception handling area or a normal warehouse area and setting the corresponding inventory location status as abnormal inventory location status; and finally, manually processing inventory information of a location where the abnormal pallet is located and updating the inventory information data set.

In an embodiment, the data dictionary further includes a handling pallet exception data set for storing relevant data when the handling pallet is abnormal, and the step 4 is as follows:

firstly, the AGV job automatic scheduling system unit generating scheduling instructions according to the principle of qualified surplus materials first, through the transportation job requirement data set, external inventory information data set and an inventory location status in the inventory information data set in the data dictionary, and scheduling a specific AGV to execute job instructions; and secondly, the AGV job automatic scheduling system unit detecting whether an identity number of a pallet performing the job is consistent with an assigned logical identity number of the pallet during the loading; when consistent, the AGV job automatic scheduling system unit allowing the AGV to continue to execute the instructions and updating the transportation job requirement data set; and when inconsistent, the AGV job automatic scheduling system unit detecting whether the pallet performing the job is empty, and writing an exception notification including a wrong identity number of the pallet and a correct identity number of the pallet into the handling pallet exception data set; when the pallet performing the job is empty, the AGV job automatic scheduling system unit allowing the AGV to continue to execute the current transportation job instruction and updating the transportation job requirement data set; and when the pallet performing the job is not empty, namely loaded with a material or materials, the AGV job automatic scheduling system unit stopping the AGV and alarming for manual processing and confirmation, or transporting the pallet to an exception handling area or a normal warehouse area and setting the corresponding inventory location status as abnormal inventory location status.

In an embodiment, the inventory information of the inventory information data set in the data dictionary is updated through the material status interaction data set, and the AGV job automatic scheduling system unit updates the inventory information data in the following manner:

firstly, the AGV job automatic scheduling system unit obtaining a transaction type through the material status interaction data set;

secondly, when the transaction type obtained by the AGV job automatic scheduling system unit is a quick check, the AGV job automatic scheduling system unit directly obtaining a material status flag recorded in the material status interaction data set, and updating the material information together with the status flag to the inventory information data set; when the transaction type obtained by the AGV job automatic scheduling system unit is processing of overdue materials, the AGV job automatic scheduling system unit obtaining interaction values recorded in the material status interaction data set, and re-determining whether the material status is overdue in combination with relevant information in the material information definition data set and the inventory information data set, and updating thereby the inventory information data set accordingly; and finally, the AGV job automatic scheduling system unit modifying material status interaction data set to feed back the processed flags and time of the processing.

In an embodiment, the AGV job automatic scheduling system unit includes an executing job data set for recording all jobs being executed; the AGV job automatic scheduling system unit provides the MES system unit with in-stock inventory information and in-transit inventory information through the interface inventory information data set in combination with the executing job data set.

In an embodiment, the MES system unit has a function of canceling a job being executed in the AGV job automatic scheduling system unit; steps for the MES system unit to cancel a job comprise:

step i, the MES system unit applying for canceling a job being executed in a station corresponding to specific equipment by changing data items in the transportation job requirement data set;

step ii, the AGV job automatic scheduling system unit receiving the application for cancellation by receiving the transportation job requirement data set; and step iii, the AGV job automatic scheduling system unit determining whether the job can be cancelled according to whether or not a pallet on the AGV is loaded with materials; when determining that the job can be canceled, the AGV job automatic scheduling system unit directly changing the transportation job requirement data set to cancel the job, thereby releasing the AGV and restoring the inventory information data set to a status before cancellation; when determining that the job cannot be canceled, the AGV job automatic scheduling system unit giving feedback that the cancellation is prohibited to the MES system unit by changing the transportation job requirement data set.

In an embodiment, the MES system unit has a function of monitoring a running status of each AGV in the AGV job automatic scheduling system unit, and the AGV job automatic scheduling system unit transmits the running status of the AGV through the AGV status data set in the data dictionary; the running status of the AGV includes fault, manual operation, low battery, front and rear obstacles, blocking, being blocked, and whether being loaded; the MES system unit displays the corresponding running status of the AGV through the AGV status data set.

The method of the present application has the following beneficial effects: in the present application, the data transmission and processing unit performs interface integration through a data dictionary, which includes a material information definition data set, a transportation job requirement data set, an external inventory information data set, an inventory information data set, a material status interaction data set, a handling pallet exception data set and an AGV status data set. The data transmission and processing unit includes a first interface configured to communicate with the MES system unit, and a second interface configured to communicate with the AGV job automatic scheduling system unit. The MES system unit and the AGV job automatic scheduling system unit communicate with the data transmission and processing unit through the interfaces, so that both the MES system unit and the AGV job automatic scheduling system unit can independently modify the corresponding data set, receive the modification status of the corresponding data set, and clarify the relevant data in the manufacturing process in the factory and store them in the above-mentioned data sets, which can effectively avoid the inconsistency and irregularity of the data that needs to be mutually transmitted when interfaces of the MES system unit and the AGV job automatic scheduling system unit are integrated. Therefore, the workload of non-standardized interface customization of the MES system unit and the AGV operation automatic scheduling system unit is greatly reduced, which is more conducive to the seamless connection between the MES system and the AGV system in the manufacturing process in the digital workshop, thereby enabling interconnection and interoperability. For system integrators, software suppliers and equipment suppliers, the standardization and efficiency of product development of respective systems can be greatly improved; for end users, the level of integration and application of digital workshop equipment and information systems can also be greatly improved. Thus, the management level and production efficiency of the in-process product are improved, and the product failure rate is reduced, both of which are of great significance.

DETAILED DESCRIPTION OF THE EMBODIMENTS

Technical solutions of the present application will be described clearly and completely below in conjunction with specific embodiments. It should be understood by those skilled in the art that the embodiments described below are only for illustrating the present application and should not be construed as limiting the scope of the present application. All other embodiments obtained by those of ordinary skill in the art based on the embodiments in the present application without creative efforts shall fall within the protection scope of the present application.

Embodiments of an interface integration method of AGV job automatic scheduling system and MES system of the present application are as follows.

As shown in FIGS. 1 to 6, provided is an interface integration method of AGV job automatic scheduling system and MES system, involving an AGV job automatic scheduling system unit, an MES system unit and a data transmission and processing unit. The data transmission and processing unit performs interface integration through a data dictionary; the data dictionary includes a material information definition data set, a transportation job requirement data set, an external inventory information data set, an inventory information data set, a material status interaction data set and an AGV status data set. The data transmission and processing unit includes a first interface configured to communicate with the MES system unit, and a second interface configured to communicate with the AGV job automatic scheduling system unit. The MES system unit changes the transportation job requirement data set and the external inventory information data set in the data transmission and processing unit through the first interface, to allow the AGV job automatic scheduling system unit in combination with the material information definition data set to generate a transportation job requirement; the MES system unit changes the material status interaction data set through the first interface, to allow the AGV job automatic scheduling system unit in combination with the material information definition data set to control inventory material check and overdue material processing; the MES system unit obtains the inventory information data set through the first interface, to guide on-site production equipment to schedule production in combination with the material information definition data set; and the MES system unit obtains the AGV status data set through the first interface to display running status of the AGV job automatic scheduling system. The AGV job automatic scheduling system unit changes the transportation job requirement data set in the data transmission and processing unit through the second interface to feedback job execution status to the MES system unit.

The data dictionary includes definitions of the data sets as follows: the definition of the material information definition data set as shown in Table 1, the definition of the transportation job requirement data set as shown in Table 2, the definition of the external inventory information data set as shown in Table 3, the definition of the inventory information data set as shown in Table 4, the definition of the material status interaction data set as shown in Table 5, and the definition of the AGV state data set as shown in Table 6.

TABLE 1

MesDownAGVMatDef: Material information definition data set

| No. | Name | Description | Type | Length |
|---|---|---|---|---|
| 1 | Uuid | Unique ID | nvarchar | 60 |
| 2 | Version | Version | bigint | |
| 3 | MatId | ID of materials | nvarchar | 30 |
| 4 | MatName | Name of materials | nvarchar | 250 |
| 5 | SortId | ID of sort | nvarchar | 30 |
| 6 | OldMatId | OriginalID of materials | nvarchar | 250 |
| 7 | Specification | Specification | nvarchar | 100 |
| 8 | Model | Model | nvarchar | 100 |
| 9 | Size | Size | nvarchar | 30 |
| 10 | Unit | Unit | nvarchar | 30 |
| 11 | MatClass | Class of materials | nvarchar | 30 |
| 12 | ShelfLifeDays | Maximum shelflife (hours) | int | |
| 13 | MinShelfLifeDays | Minimum shelflife (hours) | int | |
| 14 | AlarmTime | Alarm time (hours) | int | |
| 15 | IsInUsed | Whether being in use | char | 1 |
| 16 | Memo | Memo | nvarchar | 100 |

TABLE 2

MesDownAGVMatReq: Transportation jobrequirement data set

| No. | Name | Description | Type | Length |
|---|---|---|---|---|
| 1 | Uuid | Unique ID | nvarchar | 60 |
| 2 | Version | Version | bigint | |
| 3 | EquipmentId | ID of equipment | nvarchar | 30 |
| 4 | PositionId | ID of position | nvarchar | 30 |
| 5 | EventTime | Time of event | datetime | |

TABLE 2-continued

MesDownAGVMatReq: Transportation jobrequirement data set

| No. | Name | Description | Type | Length |
|---|---|---|---|---|
| 6 | MatId | ID of materials | nvarchar | 30 |
| 7 | RequireFlag | Requirementflag (0: having no requirement; 1: having requirement) | char | 1 |
| 8 | ReturnCode | Feedback flag | char | 1 |
| 9 | MsgType | Message type (0: sending; 1: returning; 9: terminating request; D0: AGVreturning deleting confirmation; D1: AGVrejecting request) | nvarchar | 60 |
| 10 | MatClass | Class of materials | nvarchar | 10 |
| 11 | PalletType | Type of pallet | nvarchar | 10 |
| 12 | CreateDate | Time of creation | datetime | |

TABLE 3

Mesupgoup: External inventory information data set

| No. | Name | Description | Type | Length |
|---|---|---|---|---|
| 1 | Uuid | Unique ID | nvarchar | 60 |
| 2 | Version | Version | bigint | |
| 3 | EquipmentId | ID of equipment | nvarchar | 30 |
| 4 | PositionType | Type of position (0: raw material; 1: finished product) | char | 1 |
| 5 | PositionId | ID of position | nvarchar | 30 |
| 6 | MatId | ID of materials | nvarchar | 30 |
| 7 | MatUpNum | Number of materials | decimal | 18.4 |
| 8 | MatUseNum | Number of used materials | decimal | 18.4 |
| 9 | MatWasteNum | Number of waste materials | decimal | 18.4 |
| 10 | PalletId | ID of pallet | nvarchar | 20 |
| 11 | Barcode | Barcode of materialbatch | nvarchar | 30 |
| 12 | GoUpTime | Time ofmaterialsgoing up | datetime | |
| 13 | GoDownTime | Time of materials going down | datetime | |
| 14 | GoUpFlag | Flag of materials going up | char | 1 |
| 15 | GoDownFlag | Flag of materials going down | char | 1 |
| 16 | EventTime | Timeofevent | datetime | |
| 17 | PalletType | Typeofpallet | nvarchar | 10 |

TABLE 4

MesUpStore: Inventory information data set

| No. | Name | Description | Type | Length |
|---|---|---|---|---|
| 1 | Uuid | Unique ID | nvarchar | 60 |
| 2 | Version | Version | bigint | |
| 3 | StoreId | ID of warehouse | nvarchar | 10 |
| 4 | CellId | ID of inventory location | nvarchar | 20 |
| 5 | PalletId | ID of pallet | nvarchar | 20 |
| 6 | Barcode | Barcode of material batch | nvarchar | 30 |
| 7 | MatId | ID of materials | nvarchar | 30 |
| 8 | Qty | Quantity of materials | decimal | 14.4 |
| 9 | EquipmentId | ID of equipment | nvarchar | 30 |
| 10 | StationId | ID of station | nvarchar | 30 |
| 11 | InputTime | Time of warehousing | datetime | |
| 12 | UserId | ID of warehousing User | nvarchar | 30 |
| 13 | MatClass | Class of materials | nvarchar | 30 |
| 14 | InputType | Type of warehousing | nvarchar | 10 |
| 15 | ProductionTime | Time of production | datetime | |
| 16 | IsOverdue | Overdue or not (Y: overdue; N: not overdue) | char | 1 |
| 17 | Flag | Status flag (0: in-stock; 1: in-transit) | char | 1 |
| 18 | QCStatus | Quick check status (0: unchecked; 1: qualified) | char | 1 |
| | | | nvarchar | 1 |
| 19 | ExtensionHour | Time of extension | int | |

TABLE 5

MesDownMaterialSatus: materialstatus interaction data set

| No. | Name | Description | Type | Length |
|---|---|---|---|---|
| 1 | Uuid | Unique ID | nvarchar | 60 |
| 2 | Version | Version | bigint | |
| 3 | TransactionType | Transaction Type(01: quick check; 02: processing of overdue materials) | nvarchar | 4 |
| 4 | MatID | ID of materials | nvarchar | 30 |
| 5 | Barcode | Barcode of materialbatch | nvarchar | 30 |
| 6 | Status | Materialstatus (0: not qualified; 1: qualified) | nvarchar | 1 |
| 7 | TransactionValue | Interaction value of transaction | int | |
| 8 | HandShake | Interaction flag(1: completion of execution by MES; 2: read and completion of execution by AGV) | nvarchar | 1 |
| 9 | EventTime | Time of event | datetime | |

TABLE 6

MesUpDOS: AGV state data set

| No. | Name | Description | Type | Length |
|---|---|---|---|---|
| 1 | Uuid | Unique ID | nvarchar | 60 |
| 2 | Version | Version | bigint | |
| 3 | AGVId | ID of AGV | nvarchar | 30 |
| 4 | DocTime | Time | datetime | |
| 5 | VcStatus | Status of vehicle | nvarchar | 16 |
| 6 | VcFaultCode | Fault code | nvarchar | 30 |
| 7 | VcFaultCode2 | Fault code (in binary) | nvarchar | 100 |
| 8 | VcFaultContents | Fault contents | nvarchar | 250 |
| 9 | SyncFlag | Synchronization flag | char | 1 |
| 10 | SyncDate | Synchronization time | datetime | |

Figure 2:
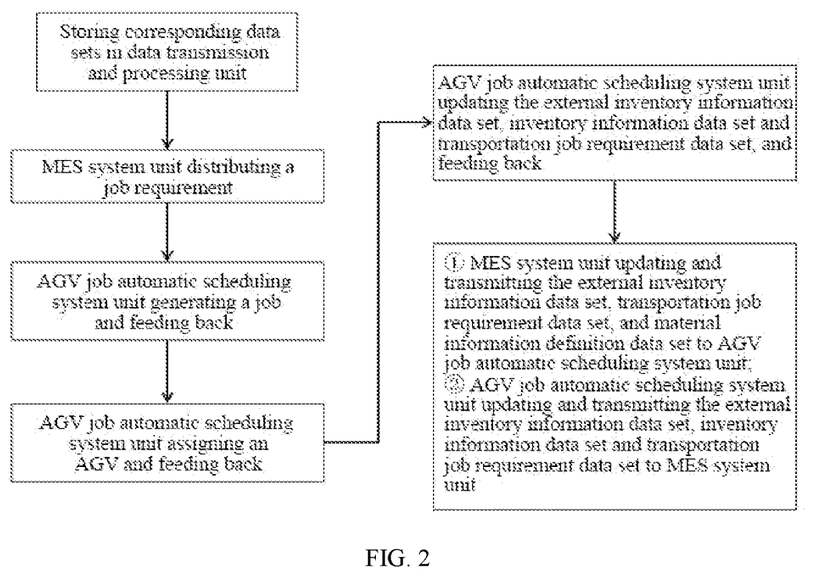
FIG. 2 is a flow chart showing an AGV job automatic scheduling system unit performing a warehousing/an ex-warehousing job.

The transportation job requirement generated by the AGV job automatic scheduling system unit includes a warehousing job, an ex-warehousing job and updating inventory information. The warehousing job comprises returning surplus materials from a loading station of the equipment, returning an empty pallet from the loading station, and warehousing a finished product from an unloading station. The ex-warehousing job comprises loading the loading station with the materials and loading the unloading station with the empty pallet. The MES system unit has a function of canceling a job being executed in the AGV job automatic scheduling system unit.

Steps for the AGV job automatic scheduling system unit to perform the warehousing job are as follows:

Step 1, storing the material information definition data set, the material status interaction data set, the transportation job requirement data set, the external inventory information data set, the inventory information data set and the AGV status data set in the data transmission and processing unit.

Wherein the MES system unit and the AGV job automatic scheduling system unit can perform reading and writing on the transportation job requirement data set, the external inventory information data set and the material status interaction data set; the material information definition data set can only be written by the MES system unit, while the AGV job automatic scheduling system unit can only read the material information definition data set; the inventory information data set and the AGV status data set can only be written by the AGV job automatic scheduling system unit, while the MES system unit can only read the inventory information data set and the AGV status data set.

Step 2, the MES system unit distributing the job requirement by changing the transportation job requirement data set and the external inventory information data set.

Step 3, the AGV job automatic scheduling system unit accepting the job by receiving the transportation job requirement data set and the external inventory information data set, and further generating the transportation job in combination with the inventory information data set, the external inventory information data set and the material information definition data set, and then feeding back the status of the received job by updating data items in the transportation job requirement data set.

Step 4, the AGV job automatic scheduling system unit assigning a specific AGV to perform the transportation job and updating the transportation job requirement data set, and then feeding back a job progress in the transportation job requirement data set through an execution status of the AGV.

Wherein the transportation job requirement data set includes data items used to reflect the progress of the AGV. These data items of progress of the AGV can be defined as different values, each of which corresponds to a unique job progress. The job progress includes initiation of start, completion of loading, completion of unloading, completion of job, abnormal termination, loading error, unloading error, completion of weighting, manual deletion, and successful cancellation of job.

Figure 3:
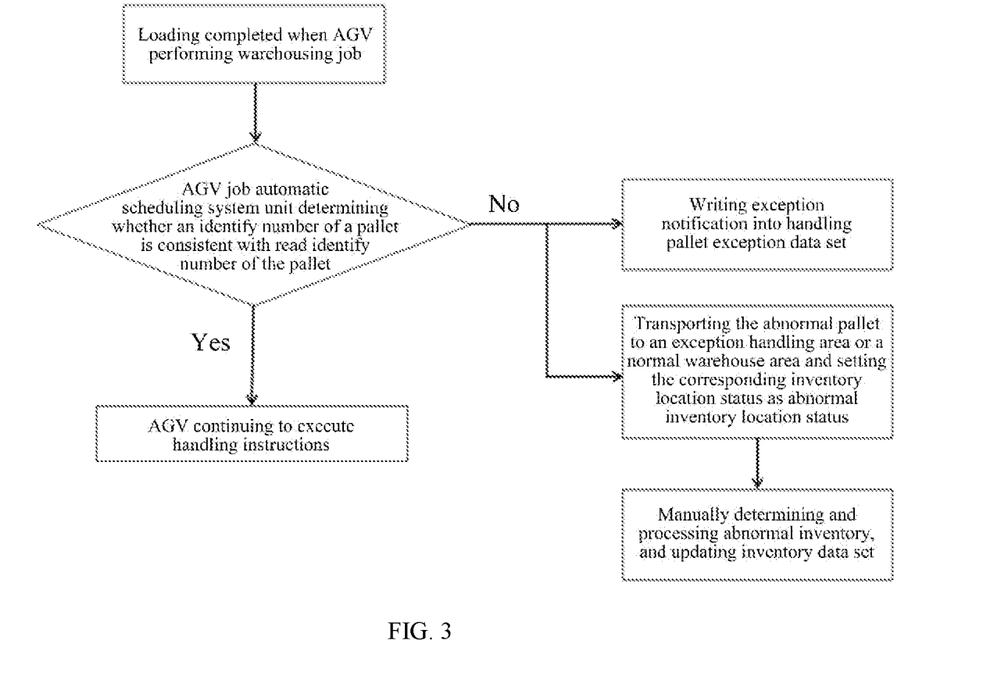
FIG. 3 is a flow chart showing an AGV loading materials when an AGV job automatic scheduling system unit performs a warehousing job.

The data dictionary in the data transmission and processing unit further includes a handling pallet exception data set used to store relevant data when the handling pallet is abnormal. In this step, the specific manner for the AGV to load the materials is as follows: firstly, the AGV job automatic scheduling system unit generates scheduling instructions through the transportation job requirement data set and an inventory location status in the inventory information data set in the data dictionary, and schedules a specific AGV to execute job instructions. Secondly, the AGV job automatic scheduling system unit detects whether an identity number of a pallet performing the job is consistent with an assigned logical identity number of the pallet during the loading; when consistent, the AGV job automatic scheduling system unit allows the AGV to continue to execute the instructions and updates the transportation job requirement data set; and when inconsistent, the AGV job automatic scheduling system unit writes an exception notification including a wrong identity number of the pallet and corresponding material information, as well as a correct identity number of the pallet and corresponding material information into the handling pallet exception data set, and then transports the pallet to an exception handling area or a normal warehouse area and sets the corresponding inventory location status as abnormal inventory location status. Finally, inventory information of a location where the abnormal pallet is located is manually processed, and the inventory information data set is thereby updated.

The definition of the handling pallet exception data set is shown in Table 7.

TABLE 7

MesUpAbnormalPallet: Handling pallet exception data set

| No. | Name | Description | Type | Length |
|---|---|---|---|---|
| 1 | Uuid | Unique ID | nvarchar | 60 |
| 2 | Version | Version | bigint | |
| 3 | PositionId | ID of station | nvarchar | 30 |
| 4 | MatId | ID of materials | nvarchar | 30 |
| 5 | ActualPalletId | ID of actual pallet | nvarchar | 30 |

TABLE 7-continued

MesUpAbnormalPallet: Handling pallet exception data set

| No. | Name | Description | Type | Length |
|---|---|---|---|---|
| 6 | CommandPalletd | ID of logical pallet | nvarchar | 30 |
| 7 | EventTime | Time of event | datetime | |
| 8 | InteractionFlag | Interaction status | char | 2 |

Step 5, the AGV job automatic scheduling system unit deleting information about pallets carried by the AGV from the external inventory information data set when the loading is completed, adding information about pallets carried by the AGV to the inventory information data set when unloading is completed, and updating the status of the data items in the transportation job requirement data set when the loading is completed or when the unloading is completed, so as to give feedback on the status of the job.

Step 6, the MES system unit and the AGV job automatic scheduling system unit sending and receiving the transportation job requirement data set and the external inventory information data set regularly or in real time by means of timed polling in combination with data status triggering, the MES system unit regularly sending and then transmitting the material information definition data set to the AGV job automatic scheduling system unit through the data transmission and processing unit, and the AGV job automatic scheduling system unit sending, in real time, and then transmitting the inventory information data set to the MES system unit through the data transmission and processing unit.

Steps for the AGV job automatic scheduling system unit to perform the ex-warehousing job are roughly the same as the steps for the warehousing job. The specific steps for performing the ex-warehousing job are the following steps of 1' to 6':

Step 1', storing the material information definition data set, the material status interaction data set, the transportation job requirement data set, the external inventory information data set, the inventory information data set and the AGV status data set in the data transmission and processing unit.

Step 2', the MES system unit distributing the job requirement by changing the transportation job requirement data set and the external inventory information data set.

Step 3', the AGV job automatic scheduling system unit accepting the job by receiving the transportation job requirement data set and the external inventory information data set, and further generating the transportation job in combination with the inventory information data set, the external inventory information data set and the material information definition data set, and then feeding back the status of the received job by updating data items in the transportation job requirement data set.

Step 4', the AGV job automatic scheduling system unit assigning a specific AGV to perform the transportation job and updating the transportation job requirement data set, and then feeding back a job progress in the transportation job requirement data set through an execution status of the AGV.

Figure 4:
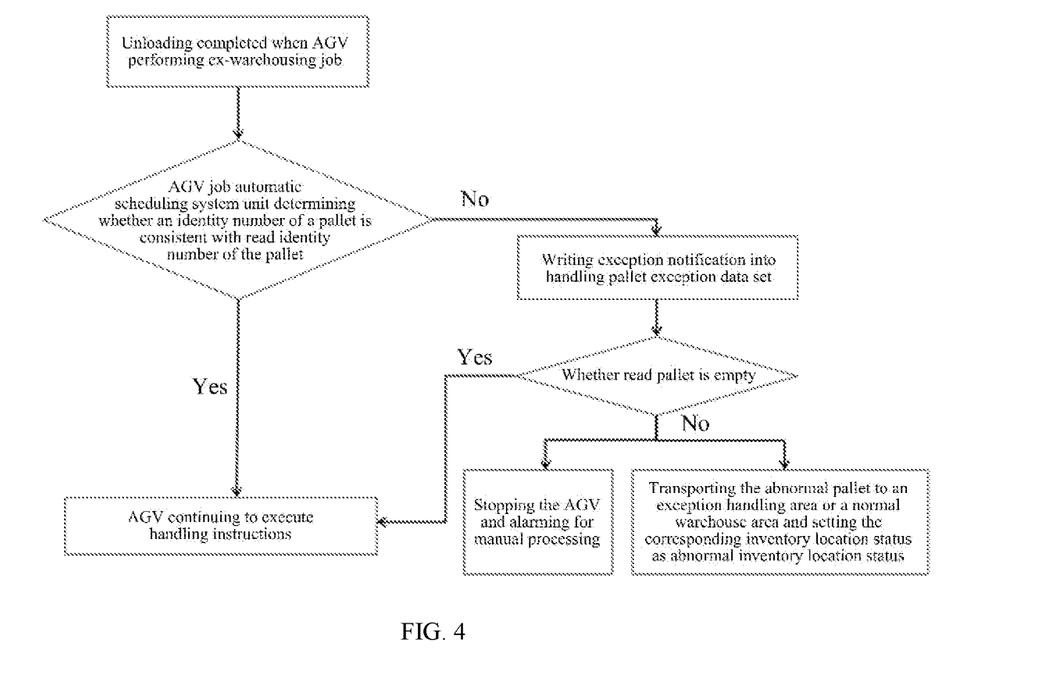
FIG. 4 is a flow chart showing an AGV loading materials when an AGV job automatic scheduling system unit performs an ex-warehousing job.

In this step, the specific manner for the AGV to load the materials are as follows: firstly, the AGV job automatic scheduling system unit generates scheduling instructions according to the principle of qualified surplus materials first, through the transportation job requirement data set, external inventory information data set and an inventory location status in the inventory information data set in the data dictionary, and schedules a specific AGV to execute job instructions. Secondly, the AGV job automatic scheduling system unit detects whether an identity number of a pallet performing the job is consistent with an assigned logical identity number of the pallet during the loading; when consistent, the AGV job automatic scheduling system unit allows the AGV to continue to execute the instructions and updates the transportation job requirement data set; and when inconsistent, the AGV job automatic scheduling system unit detects whether the pallet performing the job is empty, and writes an exception notification including a wrong identity number of pallet and a correct identity number of the pallet into the handling pallet exception data set; when the pallet performing the job is empty, the AGV job automatic scheduling system unit allows the AGV to continue to execute the current transportation job instruction and updates the transportation job requirement data set; and when the pallet performing the job is not empty, namely, loaded with a material or materials, the AGV job automatic scheduling system unit stops the AGV and alarms for manual processing and confirmation, or transports the pallet to an exception handling area or a normal warehouse area and sets the corresponding inventory location status as abnormal inventory location status.

Step 5', the AGV job automatic scheduling system unit deleting information about pallets carried by the AGV from the inventory information data set when the loading is completed, adding the information about pallets carried by the AGV to the external inventory information data set when unloading is completed, and updating the status of the data items in the transportation job requirement data set when the loading is completed or when the unloading is completed, so as to give feedback on the status of the job.

Step 6', the MES system unit and the AGV job automatic scheduling system unit sending and receiving the transportation job requirement data set and the external inventory information data set regularly or in real time by means of timed polling in combination with data status triggering, the MES system unit regularly sending and then transmitting the material information definition data set to the AGV job automatic scheduling system unit through the data transmission and processing unit, and the AGV job automatic scheduling system unit sending, in real time, and then transmitting the inventory information data set to the MES system unit through the data transmission and processing unit.

Figure 5:
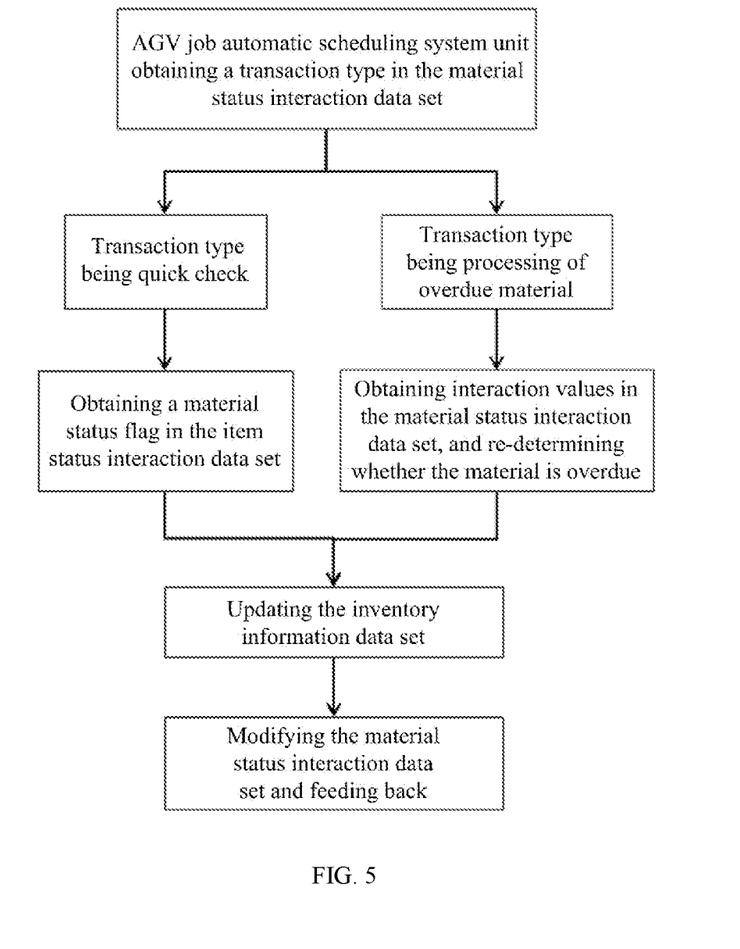
FIG. 5 is a flow chart showing an AGV job automatic scheduling system unit updating inventory information.

The inventory information of the inventory information data set in the data dictionary is updated through the material status interaction data set, and the AGV job automatic scheduling system unit updates the inventory information data set in the following manner: firstly, the AGV job automatic scheduling system unit obtains a transaction type in the material status interaction data set; secondly, when the transaction type obtained by the AGV job automatic scheduling system unit isa quick check, the AGV job automatic scheduling system unit directly obtains a material status flag recorded in the material status interaction data set, and updates the material information together with the status flag to the inventory information data set; when the transaction type obtained by the AGV job automatic scheduling system unit is processing of overdue materials, the AGV job automatic scheduling system unit obtains interaction values recorded in the material status interaction data set, and re-determines whether the material status is overdue in combination with relevant information in the material information definition data set and the inventory information data set, and updates thereby the inventory information data set accordingly; and finally, the AGV job automatic scheduling system unit modifies material status interaction data set to feed back the processed flags and time of the processing.

The inventory materials are classified into overdue materials and normal inventory materials (i.e., non-overdue materials). When checking the non-overdue materials, the data item of the transaction type of the material status interaction data set is recorded as a quick check; and when checking the overdue materials, the data item of the transaction type of the material status interaction data set is recorded as processing of overdue materials. When it is determined that the use time of overdue materials can be extended after checking, the extended time can be recorded in the interaction value data item in the material status interaction data set. Then the inventory information data set is updated according to the maximum shelf life data item, the minimum shelf life data item, the maximum aging period data item of the corresponding batch of materials recorded in the material information definition data set, as well as the warehousing time data item recorded in the inventory information data set, so that the overdue materials become non-overdue.

The AGV job automatic scheduling system unit includes an executing job data set for recording all jobs being executed; the AGV job automatic scheduling system unit provides the MES system unit with in-stock inventory information and in-transit inventory information through the interface inventory information data set in combination with the executing job data set. When the number of AGVs involved in the AGV job automatic scheduling system is large, the amount of materials in transit at the same time is also large. In such a way, the MES can accurately obtain the inventory materials in the AGV system.

Figure 6:
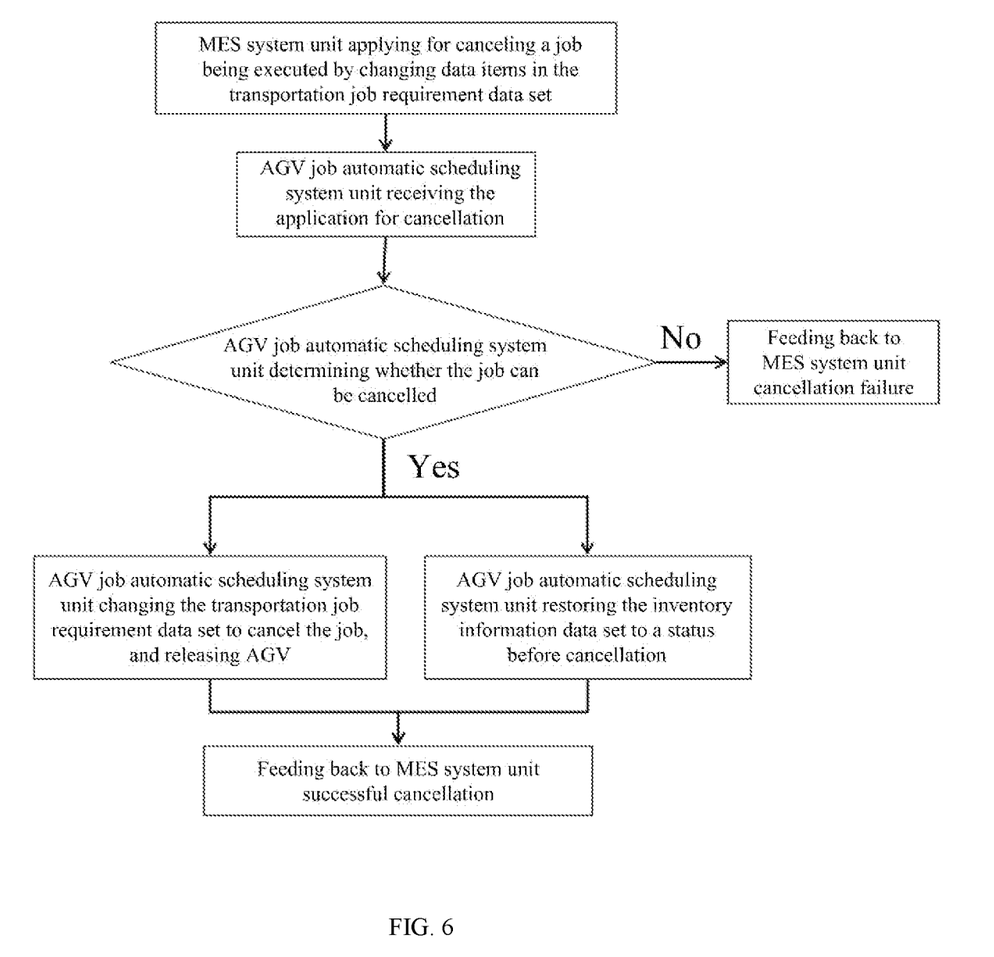
FIG. 6 is a flow chart showing an MES system unit canceling a job being executed in an AGV job automatic scheduling system unit.

The MES system unit has a function of canceling a job being executed in the AGV job automatic scheduling system unit; steps for the MES system unit to cancel a job include: step i, the MES system unit applying for canceling a job being executed in a station corresponding to specific equipment by changing data items in the transportation job requirement data set; step ii, the AGV job automatic scheduling system unit receiving the application for cancellation by receiving the transportation job requirement data set; and step iii, the AGV job automatic scheduling system unit determining whether the job can be cancelled according to whether or not a pallet on the AGV is loaded with materials; when determining that the job can be canceled, the AGV job automatic scheduling system unit directly changing the transportation job requirement data set to cancel the job, thereby releasing the AGV, and restoring the inventory information data set to a status before cancellation; when determining that the job cannot be canceled, the AGV job automatic scheduling system unit giving feedback that the cancellation is prohibited to the MES system unit by changing the transportation job requirement data set.

When the MES system unit performs job cancellation, the AGV job automatic scheduling system unit determines that the job cannot be cancelled if the AGV is loaded with a pallet carrying materials, and determines that the job can be canceled if there is no pallet carrying materials loaded on the AGV.

The MES system unit has a function of monitoring a running status of each AGV in the AGV job automatic scheduling system unit, and the AGV job automatic scheduling system unit records the running status of the AGV through the AGV status data set; the running status of the AGV includes fault, manual operation, low battery, front and rear obstacles, blocking, being blocked, and whether being loaded; the MES system unit displays the corresponding running status of the AGV through the AGV status data set.

Preferred embodiments of the present application will be described in detail below in conjunction with examples. It should be understood that the following embodiments are for illustrative purposes only, and are not intended to limit the protection scope of the present application. Those skilled in the art can make various modifications and substitutions to the present application without departing from the concept of the present application, and all such modifications and substitutions fall within the scope of protection claimed in the claims of the present application.

Figure 1:
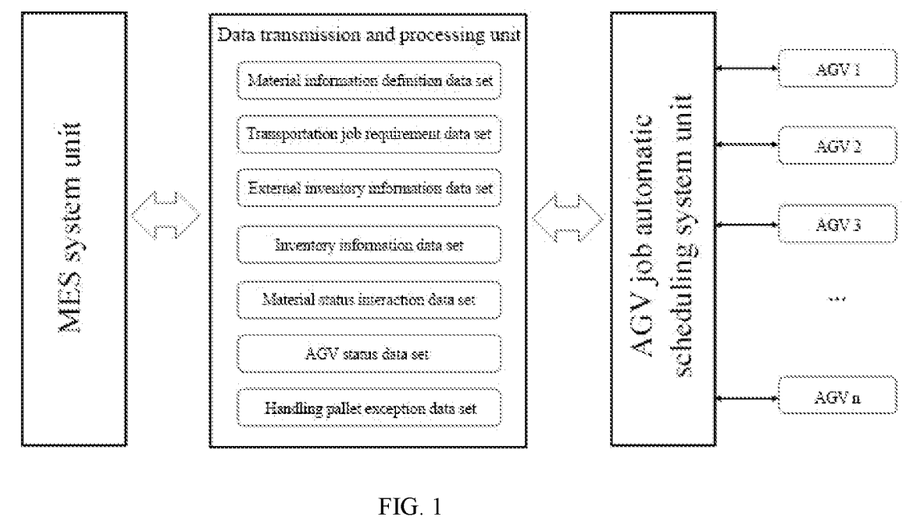
FIG. 1 is a structural diagram of an interface integration method of AGV job automatic scheduling system and MES system according to the present application.

In an embodiment, the data transmission and processing unit obtains an interface data dictionary based on a database intermediate table, and then enables the communication between the AGV job automatic scheduling system unit and the MES system unit through the data sets in the data dictionary. In other embodiments, the data transmission and processing unit may also communicate with the AGV job automatic scheduling system unit and the MES system unit by means of data message, such as webService, webApi, and other available data communication forms. When a communication is implemented based on the form of data message, webService or webApi, it is not suitable for transmitting a large quantity of data. Provided below are the steps for the AGV job automatic scheduling system to perform a warehousing job of loading a loading station having a code of P0001 with an equipment having a code of YC-BJ-4FH1:

Step 1, storing the material information definition data set, the material status interaction data set, the transportation job requirement data set, the external inventory information data set, the inventory information data set and the AGV status data set in the data transmission and processing unit.

Step 2, the MES system unit distributing loading job requirements at the P001 position by changing the transportation job requirement data set and the external inventory information data set, and adding the information shown in Table 8 below to the transportation job data table, and in this case, it is necessary for the MES system to modify correspondingly data items of number of materials, data items of number of used materials, data items of number of waste materials, data items of time of loading, data items of flag of materials going up, and data items of time of events in the external inventory information data set.

TABLE 8

MesDownAGVMatReq

| Field | Value | Description |
| --- | --- | --- |
| EquipmentID | YC-BJ-4FH1 | ID of equipment |
| PositionID | P001 | ID of position |
| EventTime | 2017-08-0108:00:00 | Time of event |
| MatId | 226100001 | ID of material |
| RequireFlag | 1 | Requirement flag |
| ReturnCode | 0 | AGVprogress |
| MsgType | 0 | Type of job |
| PalletType | 90 | Type of pallet |
| CreateDate | 2017-08-0108:00:00 | Time of creation |

Step 3, the AGV job automatic scheduling system unit accepting the job by receiving the transportation job requirement data set and the external inventory information data set, and further generating the transportation job in combination with the inventory information data set, the external inventory information data set and the material information definition data set, and feeding back the status of the received job by updating the data items in the transportation job requirement data set. The transportation job data set updated by the AGV job automatic scheduling system unit is shown in Table 9.

TABLE 9

MesDownAGVMatReq

| Field | Value | Description |
|---|---|---|
| EquipmentID | YC-BJ-4FH1 | ID of equipment |
| PositionID | P001 | ID of position |
| EventTime | 2017-08-0108:00:10 | Time of event |
| MatId | 226100001 | ID of material |
| RequireFlag | 0 | Requirement flag |
| ReturnCode | 01 | AGVprogress, 01: received |
| MsgType | 0 | Type of job |
| PalletType | 90 | Type of pallet |
| CreateDate | 2017-08-0108:00:00 | Time of creation |

Step 4, the AGV job automatic scheduling system unit assigning a job to a specific AGV, updating the transportation job requirement data set, and updating the job progress in the transportation job requirement data set through the feedback on AGV progress execution status. The transportation job data set updated by the AGV job automatic scheduling system unit is shown in Table 10.

TABLE 10

MesDownAGVMatReq

| Field | Value | Description |
|---|---|---|
| EquipmentID | YC-BJ-4FH1 | ID of equipment |
| PositionID | P001 | ID of position |
| EventTime | 2017-08-0108:00:20 | Time of event |
| MatId | 226100001 | ID of material |
| RequireFlag | 0 | Requirement flag |
| ReturnCode | XX | AGV progress, XX means initiation of start, completion of loading, completion of unloading, completion of job, abnormal termination, loading error, unloading error, completion of weighting, manual deletion, and successful cancellation of job when it is a value of 2, 8, 14, 16, 17, 33, 34, 53, 100 and 255, respectively |
| MsgType | 0 | Type of job |
| PalletType | 90 | Type of pallet |
| CreateDate | 2017-08-0108:00:00 | Time of creation |

Step 5, the AGV job automatic scheduling system unit deleting information about pallets carried by the AGV from the inventory information data set when the loading is completed, adding the information about pallets carried by the AGV to the external inventory information data set when unloading is completed, and updating the status of the data items in the transportation job requirement data set when the loading is completed or when the unloading is completed, so as to give feedback on the status of the job. The external inventory information data set updated by the AGV job automatic scheduling system unit is shown in Table 11, and the updated transportation job data set is shown in Table 12

TABLE 11

MesUpGoUp

| Field | Value | Description |
|---|---|---|
| PositionType | 0 | Type of position (0: raw material; 1: finished product) |

TABLE 11-continued

MesUpGoUp

| Field | Value | Description |
|---|---|---|
| PositionId | P001 | ID of position |
| MatId | 226100001 | ID of materials |
| MatUpNum | 800 | Number of materials |
| MatUseNum | 0 | Number of used materials |
| MatWasteNum | 0 | Number of waste materials |
| PalletId | B001 | ID of vehicle/pallet |
| Barcode | 20170801131010130 | Barcode of material batch |
| GoUpTime | Null | Time of materials going up |
| GoDownTime | Null | Time of materials going down |
| GoUpFlag | 0 | Flag of materials going up |
| GoDownFlag | 0 | Flag of materials going down |
| PalletType | 90 | Type of pallet |
| EventTime | 2017-08-0108:01:00 | Time of event |

TABLE 12

MesDownAGVMatReq

| Field | Value | Description |
|---|---|---|
| EquipmentID | YC-BJ-4FH1 | ID of equipment |
| PositionID | P001 | ID of position |
| EventTime | 2017-08-0108:01:00 | Time of event |
| MatId | 226100001 | ID of material |
| RequireFlag | 0 | Require flag |
| ReturnCode | XX | AGV progress, XX means completion of loading, completion of unloading, and completion of job when it is a value of 8, 14 and 16 respectively |
| MsgType | 0 | Type of job |
| PalletType | 90 | Type of pallet |
| CreateDate | 2017-08-0108:00:00 | Time of creation |

Step 6, the MES system unit and the AGV job automatic scheduling system unit sending and receiving the transportation job requirement data set and the external inventory information data set regularly or in real time by means of timed polling in combination with data status triggering, the MES system unit regularly sending and then transmitting the material information definition data set to the AGV job automatic scheduling system unit through the data transmission and processing unit, and the AGV job automatic scheduling system unit sending, in real time, and then transmitting the inventory information data set to the MES system unit through the data transmission and processing unit.

When the AGV job automatic scheduling system performs other jobs, the steps are the same as those of performing the job of loading a loading station with a material, except that the data sets involved in each step may be different during various jobs. The data tables that need to be added or updated by the MES system unit and the AGV job automatic scheduling system unit may also need to be changed adaptively.

Although the general description and specific embodiments have been used to describe the present application in detail above, it is obvious to those skilled in the art that some modifications or improvements can be made on the basis of the present application. Therefore, these modifications or improvements made without departing from the concept of the present application belong to the scope of protection of the present application.

What is claimed is:

1. An interface integration method of integrating automatic guided vehicle (AGV) job automatic scheduling system and manufacturing execution system (MES) system, comprising an AGV job automatic scheduling system unit, an MES system unit and a data transmission and processing unit;

wherein the data transmission and processing unit comprises a first interface configured to communicate with the MES system unit, and a second interface configured to communicate with the AGV job automatic scheduling system unit; the data transmission and processing unit performs interface integration through a data dictionary; the data dictionary comprises a material information definition data set, a transportation job requirement data set, an external inventory information data set, an inventory information data set, a material status interaction data set and an AGV status data set;

wherein the interface integration method comprises:

the MES system unit changing the transportation job requirement data set and the external inventory information data set in the data transmission and processing unit through the first interface, to allow the AGV job automatic scheduling system unit in combination with the material information definition data set to generate a transportation job requirement; the MES system unit changing the material status interaction data set through the first interface, to allow the AGV job automatic scheduling system unit in combination with the material information definition data set to control inventory material check and overdue material processing; the MES system unit obtaining the inventory information data set through the first interface, to guide on-site production equipment to schedule production in combination with the material information definition data set; and the MES system unit obtaining the AGV status data set through the first interface, to display running status of the AGV job automatic scheduling system; and the AGV job automatic scheduling system unit changing the transportation job requirement data set in the data transmission and processing unit through the second interface to feedback job execution status;

wherein the transportation job requirement generated by the AGV job automatic scheduling system unit comprises a warehousing job, and the warehousing job comprises returning surplus materials from a loading station of the on-site production equipment, returning an empty pallet from the loading station, and warehousing a finished product from an unloading station;

wherein steps of performing the warehousing job comprise:

step 1, storing the material information definition data set, the material status interaction data set, the transportation job requirement data set, the external inventory information data set, the inventory information data set and the AGV status data set in the data transmission and processing unit;

step 2, the MES system unit distributing a job requirement by changing the transportation job requirement data set and the external inventory information data set;

step 3, the AGV job automatic scheduling system unit accepting a job by receiving the transportation job requirement data set and the external inventory information data set, further generating the transportation job in combination with the inventory information data set, the external inventory information data set and the material information definition data set, and then feeding back a status of the job by updating data items in the transportation job requirement data set;

step 4, the AGV job automatic scheduling system unit assigning a specific AGV to perform the transportation job, updating the transportation job requirement data set, and then feeding back a job progress in the transportation job requirement data set through an execution status of the AGV;

step 5, the AGV job automatic scheduling system unit deleting information about pallets carried by the AGV from the external inventory information data set when loading is completed, adding the information about pallets carried by the AGV to the inventory information data set when unloading is completed, and updating a status of the data items in the transportation job requirement data set when the loading is completed or when the unloading is completed, to give feedback on the status of the job; and step 6, the MES system unit and the AGV job automatic scheduling system unit sending and receiving the transportation job requirement data set and the external inventory information data set regularly or in real time by means of timed polling in combination with data status triggering, the MES system unit regularly sending the material information definition data set to the AGV job automatic scheduling system unit through the data transmission and processing unit, and the AGV job automatic scheduling system unit sending in real time the inventory information data set to the MES system unit through the data transmission and processing unit.

2. The interface integration method of claim 1, wherein the transportation job requirement generated by the AGV job automatic scheduling system unit further comprises an ex-warehousing job, and the ex-warehousing job comprises loading the loading station of the on-site production equipment with a material and loading the unloading station with the empty pallet; performing the ex-warehousing job comprises steps 1', 2', 3', 4', 5' and 6', wherein steps 1'-4' and step 6' are the same as steps 1-4 and step 6 for performing the warehousing job in claim 1, and step 5' is as follows: the AGV job automatic scheduling system unit deleting the information about pallets carried by the AGV from the inventory information data set when the loading is completed, adding the information about pallets carried by the AGV to the external inventory information data set when the unloading is completed, and updating the status of the data items in the transportation job requirement data set when the loading is completed or when the unloading is completed, to give feedback on the status of the job.

3. The interface integration method of claim 1, wherein the data dictionary further comprises a handling pallet exception data set for storing relevant data when a handling pallet is abnormal, and the step 4 is as follows:

firstly, the AGV job automatic scheduling system unit generating scheduling instructions through the transportation job requirement data set and an inventory location status in the inventory information data set in the data dictionary, and scheduling a specific AGV to execute job instructions;

secondly, the AGV job automatic scheduling system unit detecting whether an identity number of a pallet performing the job is consistent with an assigned logical identity number of the pallet during the loading; when the identity number of the pallet performing the job is consistent with the assigned logical identity number of the pallet, the AGV job automatic scheduling system unit allowing the AGV to continue to execute the job instructions and updating the transportation job requirement data set; and when the identity number of the pallet performing the job is inconsistent with the assigned logical identity number of the pallet, the AGV job automatic scheduling system unit writing an exception notification comprising a wrong identity number of the pallet, material information corresponding to the wrong identity number of the pallet, a correct identity number of the pallet and material information corresponding to the correct identity number of the pallet into the handling pallet exception data set, and then transporting the pallet to an exception handling area or a normal warehouse area and setting an inventory location status corresponding to the pallet as abnormal inventory location status; and finally, manually processing inventory information of a location where the abnormal pallet is located and updating the inventory information data set.

4. The interface integration method of claim 2, wherein the data dictionary further comprises a handling pallet exception data set for storing relevant data when a handling pallet is abnormal, and the step 4 is as follows:

firstly, the AGV job automatic scheduling system unit generating scheduling instructions according to a principle of qualified surplus materials first, through the transportation job requirement data set, the external inventory information data set and an inventory location status in the inventory information data set in the data dictionary, and scheduling a specific AGV to execute job instructions; and secondly, the AGV job automatic scheduling system unit detecting whether an identity number of a pallet performing the job is consistent with an assigned logical identity number of the pallet during the loading; when the identity number of the pallet performing the job is consistent with the assigned logical identity number of the pallet, the AGV job automatic scheduling system unit allowing the AGV to continue to execute the job instructions and updating the transportation job requirement data set; and when the identity number of the pallet performing the job is inconsistent with the assigned logical identity number of the pallet, the AGV job automatic scheduling system unit detecting whether the pallet performing the job is empty, and writing an exception notification comprising a wrong identity number of the pallet and a correct identity number of the pallet into the handling pallet exception data set; when the pallet performing the job is empty, the AGV job automatic scheduling system unit allowing the AGV to continue to execute a current transportation job instruction and updating the transportation job requirement data set; and when the pallet performing the job is not empty, the AGV job automatic scheduling system unit stopping the AGV and alarming for manual processing and confirmation, or transporting the pallet to an exception handling area or a normal warehouse area and setting an inventory location status corresponding to the pallet as abnormal inventory location status.

5. The interface integration method of claim 1, wherein the transportation job requirement generated by the AGV job automatic scheduling system unit further comprises updating inventory information; the inventory information of the inventory information data set in the data dictionary is updated through the material status interaction data set, and the AGV job automatic scheduling system unit updates the inventory information data set in the following manner:

firstly, the AGV job automatic scheduling system unit obtaining a transaction type in the material status interaction data set;

secondly, when the transaction type obtained by the AGV job automatic scheduling system unit is a quick check, the AGV job automatic scheduling system unit directly obtaining a material status flag recorded in the material status interaction data set, updating material information together with the material status flag to the inventory information data set; when the transaction type obtained by the AGV job automatic scheduling system unit is processing of overdue materials, the AGV job automatic scheduling system unit obtaining interaction values recorded in the material status interaction data set, and re-determining whether a material status is overdue in combination with relevant information in the material information definition data set and the inventory information data set, and updating thereby the inventory information data set accordingly; and finally, the AGV job automatic scheduling system unit modifying the material status interaction data set to feed back processed flags and time of the processing.

6. The interface integration method of claim 5, wherein the AGV job automatic scheduling system unit comprises an executing job data set for recording jobs being executed; the AGV job automatic scheduling system unit provides the MES system unit with in-stock inventory information and in-transit inventory information through the interface inventory information data set in combination with the executing job data set.

7. The interface integration method of claim 1, wherein the MES system unit is further configured to cancel a job being executed in the AGV job automatic scheduling system unit, steps for the MES system unit to cancel a job comprise:

step i, the MES system unit applying for canceling a job being executed in a station corresponding to specific equipment by changing data items in the transportation job requirement data set;

step ii, the AGV job automatic scheduling system unit receiving the application for cancellation by receiving the transportation job requirement data set; and step iii, the AGV job automatic scheduling system unit determining whether the job is allowed to be cancelled according to whether or not a pallet on the AGV is loaded with materials; when determining that the job is allowed to be canceled, the AGV job automatic scheduling system unit directly changing the transportation job requirement data set to cancel the job, thereby releasing the AGV, and restoring the inventory information data set to a status before cancellation; when determining that the job is not allowed to be canceled, the AGV job automatic scheduling system unit giving feedback that the cancellation is prohibited to the MES system unit by changing the transportation job requirement data set.

8. The interface integration method of claim 1, wherein the MES system unit is further configured to monitor a running status of each AGV in the AGV job automatic scheduling system unit, and the AGV job automatic scheduling system unit transmits the running status of each AGV through the AGV status data set in the data dictionary; the running status of each AGV comprises fault, manual operation, low battery, front and rear obstacles, blocking, being blocked, and whether being loaded; the MES system unit displays the running status of each AGV through the AGV status data set.

9. The interface integration method of claim 2, wherein the MES system unit is further configured to monitor a running status of each AGV in the AGV job automatic scheduling system unit, and the AGV job automatic scheduling system unit transmits the running status of each AGV through the AGV status data set in the data dictionary; the running status of each AGV comprises fault, manual operation, low battery, front and rear obstacles, blocking, being blocked, and whether being loaded; the MES system unit displays the running status of each AGV through the AGV status data set.

10. The interface integration method of claim 3, wherein the MES system unit is further configured to monitor a running status of each AGV in the AGV job automatic scheduling system unit, and the AGV job automatic scheduling system unit transmits the running status of each AGV through the AGV status data set in the data dictionary; the running status of each AGV comprises fault, manual operation, low battery, front and rear obstacles, blocking, being blocked, and whether being loaded; the MES system unit displays the running status of each AGV through the AGV status data set.

11. The interface integration method of claim 4, wherein the MES system unit is further configured to monitor a running status of each AGV in the AGV job automatic scheduling system unit, and the AGV job automatic scheduling system unit transmits the running status of each AGV through the AGV status data set in the data dictionary; the running status of each AGV comprises fault, manual operation, low battery, front and rear obstacles, blocking, being blocked, and whether being loaded; the MES system unit displays the running status of each AGV through the AGV status data set.

12. The interface integration method of claim 5, wherein the MES system unit is further configured to monitor a running status of each AGV in the AGV job automatic scheduling system unit, and the AGV job automatic scheduling system unit transmits the running status of each AGV through the AGV status data set in the data dictionary; the running status of each AGV comprises fault, manual operation, low battery, front and rear obstacles, blocking, being blocked, and whether being loaded; the MES system unit displays the running status of each AGV through the AGV status data set.

13. The interface integration method of claim 6, wherein the MES system unit is further configured to monitor a running status of each AGV in the AGV job automatic scheduling system unit, and the AGV job automatic scheduling system unit transmits the running status of each AGV through the AGV status data set in the data dictionary; the running status of each AGV comprises fault, manual operation, low battery, front and rear obstacles, blocking, being blocked, and whether being loaded; the MES system unit displays the running status of each AGV through the AGV status data set.

14. The interface integration method of claim 7, wherein the MES system unit is further configured to monitor a running status of each AGV in the AGV job automatic scheduling system unit, and the AGV job automatic scheduling system unit transmits the running status of each AGV through the AGV status data set in the data dictionary; the running status of each AGV comprises fault, manual operation, low battery, front and rear obstacles, blocking, being blocked, and whether being loaded; the MES system unit displays the running status of each AGV through the AGV status data set.

* * * * *